(12) United States Patent
Kendig et al.

(10) Patent No.: US 7,569,276 B2
(45) Date of Patent: Aug. 4, 2009

(54) THERMOFORMABLE POLYESTER-CONTAINING LAMINATES

(75) Inventors: Terrance D. Kendig, Newark, DE (US); Warren S. Sobataka, Williamsburg, VA (US)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 547 days.

(21) Appl. No.: 11/011,673

(22) Filed: Dec. 14, 2004

(65) Prior Publication Data

US 2005/0136202 A1 Jun. 23, 2005

Related U.S. Application Data

(60) Provisional application No. 60/531,649, filed on Dec. 22, 2003.

(51) Int. Cl.
*B32B 5/00* (2006.01)
*B32B 7/00* (2006.01)
*B32B 15/08* (2006.01)

(52) U.S. Cl. ............... 428/423.7; 53/442; 206/497; 428/35.7; 428/98; 428/411.1

(58) Field of Classification Search ............ 428/35.7, 428/34.1
See application file for complete search history.

(56) References Cited

U.S. PATENT DOCUMENTS 4,940,634 A 7/1990 Mueller et al.
2002/0012803 A1* 1/2002 Kending ............... 428/423.7

FOREIGN PATENT DOCUMENTS

| EP | 0 322 189 A2 | 6/1989 |
| WO | WO 97/02139 | 1/1997 |
| WO | WO 02/26493 | * 4/2002 |

OTHER PUBLICATIONS

PCT International Search Report for International application No. PCT/US2004/042983, dated Jun. 8, 2005.

* cited by examiner

*Primary Examiner*—Elizabeth M Cole
*Assistant Examiner*—Brent T O'Hern
(74) *Attorney, Agent, or Firm*—RatnerPrestia

(57) ABSTRACT

Disclosed is a thermoformable film laminate that can be useful for packaging comprising or produced from (a) a thermoformable film layer comprising or produced from a polymer composition having at least 80% by weight polyethylene terephthalate polymer, said film having an outer surface and an inner surface; (b) a film layer having a heat shrinkage of at least about 5% less than (a); (c) a heat sealable layer; and optionally, (d) an additional barrier layer.

22 Claims, No Drawings

THERMOFORMABLE POLYESTER-CONTAINING LAMINATES

The invention claims the benefit of US provisional application Ser. No. 60/531,649, filed Dec. 22, 2003, the entire disclosure of which is incorporated herein by reference.

FIELD OF THE INVENTION

The present invention relates broadly to polyester-containing thermoformable film laminate and to packages comprising the laminate films.

DESCRIPTION OF THE PRIOR ART

Articles such as food items and more specifically meat, poultry and seafood products are often packaged in thermoplastic films or laminates in order to protect the product to be packaged from exterior abuse and environmental contamination, and to provide a convenient and durable package for distribution of the product and display in a display case or other point of sale. Form, fill and seal packages exist in many shapes and forms for many applications and are common in the packaging industry for foodstuffs. When dealing with meat products in particular, it is usually desirable to provide a film having good oxygen barrier characteristics, in order to reduce the passage of oxygen through the film so that detrimental effects on freshness, color, and other properties of the meat product are minimized.

It can be desirable to provide a package that provides good barrier properties and also can be used to cook the foodstuff contained within without removal of the packaging material (a "cook-in" package). It is also desirable to provide such packages that are suitable for heating or cooking in conventional, convection or microwave ovens ("dual-ovenable") or for heating in boiling water. The convenience of being able to purchase a fresh, partially cooked or value-added foodstuff in a package at the retail level and be able to insert the package directly into a conventional oven or microwave and cook the foodstuff in the package is highly desirable.

Thermoforming methods such as vacuum forming or plug-assist vacuum forming are often useful in packaging products. In general terms, thermoforming involves heating of a thermoplastic film or laminate and forming the film or laminate into a desired shape for holding a product to be inserted. This sheet of a film or laminate is usually referred to as a forming web. Various systems and devices are used in a thermoforming process, often accompanied by vacuum-assist and plug-assist components to provide the proper forming of the forming web into a predetermined shape. Thermoforming systems are well known in the art. Thermoformed packages are often useful in packaging meat or poultry products.

Many types of films and laminates have been used in thermoforming operations, including shallow draw operations in which the forming web takes on a shallow shape (that is, a relatively low profile form).

Coextruded films comprising polyolefins such as polyethylene are useful in producing thermoformable, but not as well as packages made from laminated films containing a thermoformable polyester (e.g. polyethylene terephthalate) film. In addition, coextruded film have less desirable mechanical properties, such as tensile strength and modulus, and therefore packages from these films are more apt to tear or otherwise become physically damaged during handling. Laminate films have also been employed. For example, U.S. Pat. No. 4,940,634 discloses biaxially oriented thermoplastic composite films comprising polyolefins suitable for use as forming webs in thermoforming operations. However, coextruded and laminated films comprising polyolefins generally do not possess high temperature heat resistance, which limits their application for cook-in uses.

Polyethylene terephthalate (PET) films have high heat resistance, making them suitable for cook-in uses. Such films provide strength and protection through tight adhesion to the product, though they typically have the drawback that they must be sealed with an adhesive since polyester is not heat-sealable except at exceptionally high temperatures. Packages (such as bags) sealed with adhesive are generally not as strong in the seal area as heat-sealed packages, and cannot be closed on the open end by existing heat-seal equipment.

Therefore, it is desirable to provide thermoformed packages that provide a combination of good barrier properties and heat-sealability with the ability to be used for cook-in applications.

SUMMARY OF THE INVENTION

The invention includes a thermoformable film laminate that can be useful for packaging comprising or produced from (a) a thermoformable film layer comprising a polymer composition having at least 80% by weight polyethylene terephthalate polymer, said film having a first surface and a second surface; (b) a second structural film layer adjacent to said first surface of said thermoformable film layer; (c) a heat sealable layer on said second surface of said thermoformable film layer; and optionally (d) an additional barrier layer.

The invention also includes a package comprising a film laminate having a combination of good barrier properties and heat-sealability that is useful for cooking in up to 400° F. (204.4° C.) and also will withstand freezer temperatures of −40° F. (−40° C.).

DETAILED DESCRIPTION OF THE INVENTION

The term "polyolefin" is used herein to describe thermoplastic polymers derived from the various olefins such as polyethylene, polypropylene and the like, and also includes copolymers having olefinic comonomers combined with small amounts of unsaturated ester comonomers.

The terms "oriented", "orientation" and the like are used herein to describe the process and resultant product characteristics obtained by stretching a resinous orientable polymeric thermoplastic material that is heated to its orientation temperature range and then set (some films, such as those prepared from PET or polypropylene are heat set; other materials are cooled) in order to lock-in or freeze the molecular alignment of the material in the direction of stretching. This action improves the mechanical properties of the film, such as shrink tension and orientation release stress. Both of these properties may be measured in accordance with ASTM D 2838 69 (reapproved 1975). The orientation temperature range for a given film will vary with the different resinous thermoplastic materials or blends thereof which comprise the film. Generally, this temperature range is above room temperature and below the melting point of the thermoplastic material or blend of materials. Orientation temperature ranges for the materials encompassed by the present application are well known in the art. When stretching is applied in one direction uniaxial orientation results. When stretching is applied in two directions biaxial orientation results. Oriented films suitable for thermoforming often have less than 5% shrink characteristics, although some films having greater shrink characteristics can be thermoformed.

The film laminate can comprise or be produced from (a) a layer of thermoformable polyethylene terephthalate polymer, either homopolymer or copolymer, in combination with (b) an adjacent second structural layer, (c) a sealant layer suitable for heat sealing, and (d) an optional additional oxygen and moisture barrier layer. A preferred example of the second structural film layer is made from a polyamide (nylon). A preferred example of an additional barrier layer is made from polyvinylidine chloride (PVDC).

The multilayer film laminate has (a) a thermoformable film layer and (c) a heat sealable layer on the second surface of the thermoformable film layer. In some cases, the thermoformable film layer of (a) and the heat sealable layer of (c) comprise two different compositions. However, in other cases, a composition may be suitable to function as both a thermoformable layer and a heat sealable layer. In those cases, a single layer of polymer composition having at least 80% by weight polyethylene terephthalate polymer composition provides the functions of both component (a) and component (c) of the film laminate of this invention.

The term "adjacent" means that the second structural film layer lies near the first surface of the thermoformable base film. As such, it may be bonded directly to the first surface of the base film, it may be adhered via an adhesive or tie layer to the first surface of the base film, or there may be additional layers between the second film layer and the first surface of the thermoformable base film. In any event, the second structural film layer faces the surface of the thermoformable base film that is not used to provide a sealing surface for the film laminate.

The term "value-added foodstuff" describes a foodstuff that has some additional preparation elements provided before packaging. For example, a value-added foodstuff comprises at least one food portion and additional components such as seasonings, sauces, marinades and the like. It may also comprise a mixture of different food components such as a meat portion and at least one vegetable portion that provides a meal. The present film laminate construction can withstand temperatures up to 400° F. (204.4° C.).

Preferably, a package can be prepared from a laminate film that requires no opening or slitting for venting prior to cooking. The sealant system holding the forming web and the capping web together can be designed to be self-venting allowing for an atmosphere exchange and promotes browning of the foodstuff being cooked. At the same time the foodstuff rests in the thermoformed pocket and cooks in the natural juices that are exuded. This keeps the foodstuff moist, tender and tasty and also can speed cook time.

The film laminate can be a multilayer polymeric sheet involving at least three categorical layers, including but not limited to, a thermoformable base film layer, a structural or abuse layer, an optional barrier layer, an innermost sealant layer and optionally one or more adhesive or tie layers therebetween.

Thermoformable Base Film

The thermoformable, PET film, i.e. "base film," of the present invention comprises at least about 80, or about 90, weight % PET, which can be a homopolymer or copolymer of PET. The term "PET homopolymer" means a polymer substantially derived from ethylene glycol and terephthalic acid, or alternatively, derived from the ester forming equivalents thereof (e.g., any reactants which can be polymerized to ultimately provide a polymer of polyethylene terephthalate). The term "copolymer of PET" means any polymer comprising (or derived from) at least about 50 mole percent ethylene terephthalate, and the remainder of the polymer being derived from monomers other than terephthalic acid and ethylene glycol (or their ester forming equivalents).

The PET base films can be biaxially oriented so that they have less than about 20%, or less than about 5%, shrink factor.

Suitable thermoformable polyethylene terephthalate films are available under the trademarks Mylar® and Melinex® from DuPont Teijin Films.

The multi-layer laminated heat sealable versions can be used as thermoformable lidstocks and thermoformable webstock. All versions can be used to package materials other than foodstuffs.

When combined with an additional barrier layer, the thermoformable PET layer can form a type of construction that can be used in a variety of Modified Atmospheric Packaging (MAP) or vacuum packaging formats.

The thermoformable base film to be used in the laminate can be plain (i.e. uncoated) or coated with a barrier layer such as polyvinylidene chloride to provide enhanced barrier properties and give the final package increased shelf life. In some cases, the base film may comprise an incorporated sealant layer. For example, an amorphous polyester coating can be applied to the base film prior to lamination. In some cases, the thermoformable base film is capable of heat sealing without an additional sealant layer. Alternatively, a sealant layer may be applied after formation of the laminate.

The Second Structural Layer

The thermoformable PET base film can be bonded or adhesively laminated to other materials to enhance performance of the overall structure, depending on the packaging need and intended condition of use. Examples of polymeric films useful for the additional film are nylon, polypropylene, polyethylene, ionomer, acid copolymer, ethylene vinyl acetate, polyethylene terephthalate, polystyrene, ethylene vinyl alcohol, polyvinylidene chloride, multi-layer coextrusions and combinations thereof.

For example, a structural or abuse layer may comprise oriented polyamide (nylon). This layer preferably is unaffected by the sealing temperatures used to make the package, since the package is sealed through the entire thickness of the multilayer structure. The thickness of this layer can control the stiffness of the package, and may range from about 10 to about 60 μm, or about 50 μm. The structure layers may be provided with graphic elements such as printing and embossing to provide information for the consumer and/or a pleasing appearance to the package. Preferably this layer is reverse printable. The particular multi-layered film used will in part depend upon the end use of the package. For example, packages containing bones or other hard projections will require thicker film laminate structures. The thickness of the laminate structure will also depend on the depth of the draw desired during thermoforming. A preferred material for the strength layers is a polyamide such as biaxially oriented nylon from about 0.5 mil to about 5 mils in thickness. Nylon used as an outer layer can be from about 1 to 5 mils thick. Nylon used as an inner layer in combination with another layer can be from about 0.5 to 5 mils thick.

Polyamides (nylon) suitable for use herein include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are nylon 6,6, nylon 6, nylon 6.66, blends and mixtures thereof. Nylon 6,6 is commercially available, for example, under the tradename Dartek® from DuPont Canada/Liquibox. Nylon 6 is commercially available, for example, under the tradename Nylon 4.12 from E.I.

du Pont de Nemours and Company, Wilmington, Del. (DuPont). Nylon 6.66 is commercially available under the tradenames "Ultramid C4" and "Ultramid C35" from BASF, or under the tradename "Ube5033FXD27" from Ube Industries Ltd.

For example, either uncoated thermoformable base film or a thermoformable base film one-side coated with polyvinylidene chloride can be laminated to a polyamide (nylon) film. Alternatively, uncoated thermoformable base film can be laminated to a polyamide (nylon) film one-side coated with polyvinylidene chloride. The polyvinylidene chloride-coated versions can provide enhanced barrier properties for providing extended shelf life.

Multilayer structures combining nylon and PET copolymers can be adhered using an adhesive such as a polyester urethane. The adhesive may be applied as a solution and can include the proper choice of solvent(s) (e.g., preferably tetrahydrofuran) for the adhesive so that drying can be achieved at 170° F. (76.7° C.), reducing residual solvent levels.

The solvent-based adhesive can be applied to one side (or two sides) of the base sheet by any means known to those of skill in the art. For example, the film may be coated by roller (e.g. doctor roll) coating, spray coating, gravure coating, or slot coating, preferably roller or gravure coating using a solution coating process.

For example, a two-part polyester urethane adhesive can be applied to the thermoformable PET via a gravure cylinder to serve as the laminating adhesive. The laminating adhesive is applied across the web from solution. Removal of any solvent may require the application of heat. The two film layers are then laminated using standard laminating conditions.

The adhesive used to laminate the PET film layer to the second film layer can also be "solventless." Solventless laminating adhesives are well known in the art and illustratively include waterborne acrylic emulsions, polyurethane dispersions and one and two part polyurethane systems with 100% solids. Waterborne systems require dryers after adhesive application at elevated temperatures to eliminate the water before combining with another substrate. On the other hand polyurethane systems with 100% solids rely on a chemical reaction for curing and little or no heat is required.

A preferred class of adhesives are elastomeric adhesives such as polyurethanes. However, the adhesive need not be elastomeric.

The laminating adhesive can be applied either to the thermoformable film of (a) or to the film of (b). One or both of these films can be surface treated such as by corona. In some cases both surfaces can be corona treated prior to application of an adhesive in order to promote better bonding between the film surfaces in contact with the applied adhesive. The laminating adhesive can be applied by well known coating techniques such as metering a low viscosity adhesive onto a multiple application roll system configuration that applies the adhesive to a first web or substrate. The first web is then mated to a second web or substrate by use of a heated nip roll.

The laminated nylon/polyester film then becomes the primary web for finishing the laminate into rollstock for fabrication into package stock. For example, a production web of the film may be cut to a size appropriate to prepare packages of the desired dimensions. Other post-production operations such as printing may be conducted prior to the package-forming operations.

Barrier Coating

Barrier layers can be, for example, oriented PET, polyvinylidene chloride (PVDC), ethylene vinyl alcohol (EVOH), nylon or biaxially oriented nylon, blends or composites of the same as well as related copolymers thereof. When the package is not intended for microwave heating, other barrier layers can also include metallized or silicon oxide-coated polymers. Barrier layer thickness can depend on the sensitivity of the product and the desired shelf life. In some applications, the functions of structure and barrier layers may be combined in a single layer of a suitable resin. For example, nylon or PET are suitable for both structure and barrier functions. In packages that are to be frozen for storage and preservation of the foodstuffs contained therein, it may not include an additional barrier layer. In other cases, it may be desirable to include an additional barrier layer.

A material for an optional additional barrier layer is a vinylidene polymer and particularly preferred is a polyvinylidine chloride polymer (PVDC), including copolymers comprising vinylidine chloride. These barrier layers are well known and are valuable to the food packaging industry because they provide superior resistance to fat, oil, water and steam as well as resistance to permeation of gas and odors. Polyvinylidene chloride (PVDC) suitable for use herein can be obtained commercially from Dow Chemical under the tradename Saran®, for example.

Application of barrier coatings are well known as disclosed above.

The innermost layer of the film laminate is the sealant. The sealant can have minimum effect on taste or color of the contents, to be unaffected by the product, and to withstand sealing conditions (such as liquid droplets, grease, dust, or the like). The sealant can be a resin that can be bonded to itself (sealed) to form hermetic seals (i.e., seal strengths typically greater than 1,500 g/inch; or 590/cm) at temperatures substantially below the melting temperature of the outermost layer (and other layers) so that the outermost layer's appearance will not be affected by the sealing process and will not stick to the jaws of the sealing bar. The sealant allows for package construction by formation of the film laminate into the shape desired for the package and then adhering the shaped film laminate to itself to provide a package envelope. The sealant also provides for closure of the package after filling with the contents. Sealant layers can be from about 6 to about 100 µm thick, or about 6 to about 25 µm.

Sealant can be applied across the entire web, such as in the form of a copolyester, ionomer or an ethylene vinyl acetate (EVA) copolymer. The heat-sealant material can also be an amorphous copolyester such as amorphous polyethylene terephthalate. Other sealants known to those of skill in the art could also be used. The sealant can be applied using coextrusion, extrusion coating or lamination. The sealant is incorporated into the laminates of this invention such that it is the innermost layer of the laminate, typically directly adjacent to the thermoformable PET layer.

Ionomeric resins ("ionomers") are copolymers of an olefin such as ethylene with an unsaturated carboxylic acid, such as acrylic acid, methacrylic acid, or maleic acid, and optionally softening monomers, in which at least one or more alkali metal, transition metal, or alkaline earth metal cations, such as sodium, potassium or zinc, are used to neutralize some portion of the acidic groups in the copolymer resulting in a thermoplastic resin exhibiting enhanced properties. For example, "Ethylene/(meth)acrylic acid (abbreviated E/(M)AA)" means a copolymer of ethylene (abbreviated E)/acrylic acid (abbreviated AA) and/or ethylene/methacrylic acid (abbreviated MAA) which are at least partially neutralized by one or more alkali metal, transition metal, or alkaline earth metal cations to form an ionomer. Terpolymers can also be made from an olefin such as ethylene, an unsaturated carboxylic acid and other comonomers such as alkyl (meth)

acrylates to provide "softer" resins that can be neutralized to form softer ionomers. Ionomers are known conventionally and their method of preparation is described in, for example, U.S. Pat. No. 3,344,014.

EVA copolymers are copolymers derived from copolymerization of an olefin such as ethylene with vinyl acetate. In some cases, additional unsaturated monomers may also be used to modify the properties of the EVA copolymer.

An amorphous PET copolyester heat-sealant can derive from at least the following components: from about 10 to about 60 mole % terephthalic acid ("Monomer A"); from about 10 to about 60 mole % ethylene glycol ("Monomer B"); and from about 5 to about 60 mole % of a third monomer being a secondary di-acid ("Monomer C") and/or a secondary diol ("Monomer D"). Examples of Monomer C include: succinic acid, adipic acid, azelaic acid, sebacic acid, 1,10-decanedicarboxylic acid, phthalic acid, isophthalic acid, dodecanedioic acid, and the like. Preferred Monomers C are azelaic, sebacic, and/or isophthalic acid. Examples of Monomer D include: propylene glycol, methoxypolyalkylene glycol, neopentyl glycol, trimethylene glycol, tetramethylene glycol, hexamethylene glycol, diethylene glycol, and the like.

A single layer of a polyester composition can fulfill the functions of both the thermoformable layer and the sealant layer of the film laminate of this invention. An amorphous PET suitable for both thermoforming and heat sealing is available from DuPont as Selar® PT, particularly when used in a laminate with a highly thermoformable second structural layer.

Films useful in lamination processes of this invention can be made by virtually any method for film forming known to those skilled in this art. For the purposes of the present invention, the film, in principle, can be either a single layer or multilayer polymeric film. As such, the film and film structures can be cast, extruded, co-extruded, laminated and the like, including orientation (either uniaxially or biaxially) by various methodologies (e.g., blown film, mechanical stretching or the like). Various additives known to one skilled in the art can be present in the respective film layers including the presence of tie layers and the like. Additives include antioxidants and thermal stabilizers, ultraviolet (UV) light stabilizers, pigments and dyes, fillers, delustrants, anti-slip agents, plasticizers, anti-block agents, other processing aids, and the like.

The manufacture of a film can be carried out according to any known methods. It is possible, for example, to manufacture a primary film by extruding the compositions using so-called "blown film" or "flat die" methods. A blown film is made by extruding a polymeric composition through an annular die and expanding the resulting tubular film with an air current to provide a blown film. Cast flat films are made by extruding a composition through a flat die. The film leaving the die can be cooled by at least one roll containing internally circulating fluid (a chill roll) or by a water bath to provide a cast film. A film can have a width, for example, of about 60 cm (two feet).

A monolayer or multilayer film may be hot-blown from an extrusion die at a relatively high blow-up ratio. A thermoplastic polyester of the film construction is preferably crystalline in nature and of relatively high molecular weight to maintain film integrity during the blow-up procedure. The polyester can be stretched sufficiently during the hot blowing process to provide balanced orientation in both the longitudinal (machine) and transverse directions.

Alternatively, thermoplastic crystalline materials may be stretch oriented to obtain a biaxially oriented film. For example, a tubing is extruded and then cooled and reheated, and then stretched by, for example, a blown bubble process. This process is well known in the art. In the case of stretch-oriented materials, the tubing is being stretched and oriented at a relatively low temperature in comparison with the hot blown process disclosed above.

Specific examples of laminates suitable for use as a forming web in thermoforming operations include, from outermost layer to innermost layer, PVDC Coating/nylon/adhesive/thermoformable PET/sealant; Nylon/PVDC Coating/adhesive/thermoformable PET/sealant; or Nylon/adhesive/PVDC Coating/thermoformable PET/sealant.

For example, thermoformable base films comprising oriented PET with an amorphous PET seal layer can be adhesively laminated to a second film comprising a nylon layer and a PVDC barrier coating. The second film can be oriented such that the nylon layer is facing the thermoformable PET film and adhered thereto to provide an example of the first laminate structure above. Alternatively, the PVDC coating may face the thermoformable PET film to provide an example of the first laminate structure above. In another example, a thermoformable base film comprising oriented PET and a PVDC barrier coating with an amorphous PET seal layer can be adhesively laminated to a second film comprising nylon to provide an example of the third laminate structure above.

Use in Packaging Generally

The film laminate can be used in a myriad of applications such as to form packages using existing form, fill and seal (FFS) machines available from a number of manufacturers (e.g., Tiromat and Multi-Vac).

The thermoformable, heat sealable packaging film can be used in packages to contain foodstuffs such as meat, poultry or seafood products. Examples of foodstuffs that may be packaged in packages of this invention include processed meats such as sausages, hot dogs and the like. The foodstuffs also include value-added, seasoned, marinated and/or pre-cooked meat products or prepared meals. The foodstuffs may also be whole-muscle and/or bone-in meat and poultry portions such as, for example but not limitation, pork loin, turkey or chicken breasts and the like. Poultry also includes ready-to-cook whole birds. Packages of this invention may also be used to package fresh meat, poultry and seafood in modified atmospheric packaging applications or vacuum packaging applications. The barrier features combined with a sealant that can seal through contamination can provide greater economic benefit due to reducing the materials and labor in fresh product packaging operations. Such packages can be made to be ovenable dependent upon sealant selection, and may become self-venting once the internal temperature and pressure reach the softening point of the sealant.

A preferred package of this invention consists essentially of (a) a thermoformable forming web comprising or produced from a film laminate disclosed herein and (b) a capping web in which the forming web is heat sealed to said capping web.

Packages can be formed from two film sheets, a forming web and a capping web. The two film sheets may be two individual sheets of film. Typically, in thermoforming applications, the forming web can be used to form pockets and then the pockets are filled with contents (for example, poultry) in an in-line packaging machine. The pockets can then be closed by heat sealing the margins of the forming web to a capping web in horizontal form, fill and seal applications such that the forming web and the capping web are hermetically sealed to each other.

The film structure used as the capping web is often provided having the same general film structure as the forming web, but using a nonthermoformable PET layer. Typically nonthermoformable PET has a different polymer composition than thermoformable PET and is more highly oriented.

Optionally, the capping web is surface printed or reverse printed (i.e. printed on a face that will be internal in the final laminate) to provide graphics, product information and the like. Printing is typically applied to the capping web, which is not subjected to thermoforming, so that the graphics are not distorted.

Specific examples of capping webs include, from outermost layer to innermost layer (In these examples, the ink layer represents printed graphics that are applied to the second film prior to adhesive lamination): PVDC Coating/nylon/ink/adhesive/PET/sealant; Nylon/PVDC Coating/ink/adhesive/PET/sealant; or Nylon/ink/adhesive/PVDC Coating/PET/sealant.

For example, base films comprising oriented PET with an amorphous PET seal layer can be adhesively laminated to a second film comprising a nylon layer and a PVDC barrier coating. A second film can be oriented such that the nylon layer is facing the thermoformable PET film and adhered thereto to provide an example of the first laminate structure above. The PVDC coating may also face the PET film to provide an example of the first laminate structure. Also for example, a base film comprising oriented PET and a PVDC barrier coating with an amorphous PET seal layer can be adhesively laminated to a second film comprising nylon to provide an example of the third laminate structure above.

A single web of film may be folded onto itself to provide two overlying sheets, or a tube of film may be formed such that two overlying portions of the tube provide the equivalent of two sheets of film. For example, the forming web may be folded such that a portion of the forming web, either thermoformed or flat, is placed in an overlying relationship with the thermoformed pocket containing the product. The two portions of the forming web can then be hermetically sealed to each other.

For other applications, the film may be thermoformed to provide a shaped web, then presealed to form open bags, which may then be filled with contents in an in-line packaging machine. The bags are then heat sealed to close the open end.

The film can be used for preparing non-shrink bags. The film is not thermoformed, but can be formed into bags that are filled and sealed using well-known form, fill and seal techniques. Thus, the invention also provides a package comprising a film laminate as described herein that is in the form of a non-shrink bag.

The sealant may provide a seal in which the forming web and capping web are sealed together so that the seal does not rupture on heating (a non-venting seal). Materials suitable for such seals include amorphous polyester. An amorphous PET suitable for heat sealing is available from DuPont as Selar® PT. This material may be particularly useful if contamination such as fats, juices, grease and the like are involved. Forming webs and capping webs can be prepared with this material and sealed together to provide non-venting seals. A coextruded film suitable for a capping web comprises a clear, crystalline PET layer and an amorphous PET heat seal layer. A film of this type is available from DuPont Teijin Films under the tradename Mylar® 851. A capping web of this film can be sealed to a forming web having a Selar® PT seal layer.

Vent areas can be made anywhere on the package simply by providing a slit in the package face at the time of heating.

Alternatively, temperature dependent sealant materials (self-venting) or a combination of materials including a non-venting sealant in combination with temperature dependent sealant materials (self-venting) in a three-layer laminate structure could give the desired venting effect. Self venting is a desirable safety feature to minimize the occurrence of steam blast on opening the package. In a conventional oven, once the sealant reaches its softening point and enough pressure is generated internally, the seal will rupture and vent the package. This venting also promotes air exchange for browning the meat if so desired. In another example, the sealant thickness and seal temperature can be designed to provide a vent (via rupture) once the foodstuff reaches 170° F. (76.7° C.). This may be useful when heating a foodstuff in a microwave, where the self-venting feature serves as a temperature indicator to show that the food is heated to the proper temperature and is ready for consumption.

A sealant suitable for seals that vent on heating is an amorphous PET copolyester. A coextruded film suitable for preparation of forming webs or capping webs that can be used in self-venting packages comprises a clear PET layer and an amorphous PET heat seal layer. Films of this type (having various thicknesses of clear PET and heat seal layer) are available from DuPont Teijin Films under the tradename Mylar® OL.

Packages may incorporate other features such as perforations, tear zones and the like that facilitate opening the package. Polyamide and PET (heat sealable) combinations provide excellent directional tear properties in that a pre-notched package can be torn open in a straight line in either the machine direction or transverse directions. These tear properties allow for great flexibility in package configuration and design. Thus, the opening area to access the foodstuff after heating is not limited to a particular part (e.g. the top) of the package. This can allow for locating a notch at the side of the package in the desired area for opening.

The laminate films can be also useful in fabrication of heat sealable bags and thermoformable structures for packaging any variety of products in addition to the foodstuffs enumerated herein.

The following Examples are merely illustrative, and are not to be construed as limiting the scope of the invention described and/or claimed herein.

EXAMPLES

Example 1

A specific example of a film useful as a thermoformable forming web for preparing packages as described herein was an adhesive lamination of nylon and polyester incorporating a polyester urethane adhesive designed to withstand elevated temperatures. The nylon outer layer provided toughness for puncture resistance and heat resistance to the film. It also served as an oxygen barrier and a possible print carrier. The amorphous polyester seal layer provided a temperature resistant perimeter seal.

Structural Components

Outer Structure Layer: nylon 6,6 coated with PVDC coating on one side; 3 mil thickness; available under the tradename Dartek® BF620 from DuPont of Canada/Liqui-Box.

Lamination Adhesive: Methyl ethyl ketone solvent-based polyester urethane adhesive available under the tradename Adcote 503A using catalyst F from the Morton division of Rohm and Haas.

Thermoformable/Seal Layer: biaxially oriented polyester (OPET) coated with an amorphous polyethylene terephthalate copolymer (APET) heat seal layer; 1.0 mil thickness; available under the tradename Mylar®75XPOL12 from DuPont Teijin Films.

The structural components are combined as described below to prepare a multilayer film consisting of the following layers (from outermost to innermost): PVDC/nylon/adhesive/OPET/APET.

All surfaces to be in contact with the adhesive were corona treated to 48 dynes prior to lamination. Adhesive was first applied by rotogravure process using a 110 Quad Gravure cylinder to the nylon structure layer to the face opposite the PVDC coating and dried at 170° F. (76.7° C.). The thermoformable polyester/heat seal base film was brought into the lamination as the secondary web. Both the nylon structure web and the secondary polyester web were 24 inches wide and were laminated using a 23.5-inch back up roll for adhesive lay down optimization. The non-sealable side of the polyester was laminated to the structure layer using a hot nip process at a dynamic temperature of 170° F. (76.7° C.), leaving the heat-sealable APET surface exposed to the air side upon unwinding. The heat seal layer was kept away from the hot nip to not activate the adhesive and cause the wound roll to block. The amorphous coated side of the polyester provided the high temperature seal layer for sealing to the capping web.

The forming web was thermoformed under typical thermoforming procedures well known in the packaging art into shallow-draw pockets suitable for holding chicken leg quarters and chicken breasts.

Example 2

A specific example of a film useful as a capping web for preparing packages as described herein was an adhesive lamination of nylon and polyester incorporating a polyester urethane adhesive designed to withstand elevated temperatures.

Structural Components

Outer Structure Layer: nylon 6,6 with PVDC coating on one side; 1 mil thickness; available under the tradename Dartek® B602 from DuPont of Canada/Liqui-Box.

Lamination Adhesive: Adcote 503A/Catalyst F.

Polyester Layer: biaxially oriented polyester (OPET) coated with an amorphous polyethylene terephthalate copolymer (APET) heat seal layer; 0.5 mil thickness; available under the tradename Mylar® 50OL13 from DuPont Teijin Films.

The capping web was laminated similarly as disclosed above for the forming layer to prepare a multilayer film consisting of the following layers (from outermost to innermost): PVDC/nylon/adhesive/OPET/APET.

Example 3

Chicken parts (leg quarters and breasts) were placed in the appropriately-sized pockets of the thermoformed forming web of Example 1. The capping web of Example 2 was placed over the forming web and the chicken and vacuum heat sealed to the forming web by applying vacuum for one second and then heating to 390° F. for two seconds. Sealing was accomplished through small amounts of seasoning.

Seal strength was measured to be 1600 g/inch using a Suter air-driven device used for measuring heat seals. Whole package peel strength was measured to be from about 1500 to 2000 g starting at the corner area.

Example 4

A cook test using the sealed packages of Example 3 was conducted to assess the cooking properties of the cook-in packages. The internal temperature in chicken parts of was at least 160° F.

Leg Quarter: Microwave cooking at full power for 5 minutes provided an internal chicken temperature of 145° F. Microwave cooking at full power for 7 minutes provided an internal chicken temperature of 165° F., with the chicken completely cooked. The package vented by rupture of the perimeter seal before the four-minute mark, which enhanced browning. The meat was easily removed from the bone and was very tender and moist.

Breast: Microwave cooking at full power for 7 minutes provided an internal chicken temperature of 185° F., with the chicken completely cooked.

In both cases, the chicken parts reached the required temperature of 160° F. after about 6 minutes of microwave heating.

Example 5

Another example of a film useful as a thermoformable forming web was an adhesive lamination of nylon and polyester incorporating a polyester urethane adhesive.

Structural Components

Outer Structure Layer: nylon 6,6 with PVDC coating on one side; 3 mil thickness available under the tradename Dartek® BF620 from DuPont of Canada/Liqui-Box.

Lamination Adhesive: Ethyl acetate solvent-based polyester urethane adhesive available under the tradename Lamal HSA from the Morton division of Rohm and Haas with CR-1-80 catalyst.

Thermoformable/Seal Layer: biaxially oriented thermoformable heat shrinkable polyester (OPET) coated with an amorphous polyethylene terephthalate copolymer (APET) heat seal layer; 0.9 mil thickness; available under the tradename Mylar® 80XRSOL from DuPont Teijin Films. In the absence of retaining forces such as a laminated non-shrink layer, this film could shrink 20% in the both the machine direction (MD) and transverse direction (TD) after exposure to boiling water for 5 seconds.

The structural components were combined to prepare a multilayer film consisting of the following layers (from outermost to innermost): PVDC/nylon/adhesive/OPET/APET.

All surfaces to be in contact with the adhesive were corona treated to 48 dynes prior to lamination. Adhesive was first applied by rotogravure process using a 110 Quad Gravure cylinder to the face of the nylon structure layer opposite the PVDC coating and dried at 160° F. The polyester heat seal layer was brought into the lamination as the secondary web. Both the nylon structure web and the secondary polyester web were 24 inches wide and were laminated using a 23.5-inch back up roll for adhesive lay down optimization. The non-sealable side of the polyester was laminated to the structure layer using a hot nip process at a dynamic temperature of 160° F., leaving the heat-sealable APET surface exposed to air upon unwinding.

Example 6

Another example of a film useful as a capping web was an adhesive lamination of nylon and polyester incorporating a polyester urethane adhesive designed to withstand elevated temperatures.

Structural Components

Outer Structure Layer: nylon 6,6 with PVDC coating on one side; 1.5 mil thickness available under the tradename Dartek® B602 from DuPont of Canada/Liqui-Box.

Lamination Adhesive: Adcote 503A/Catalyst F.

Polyester Layer: biaxially oriented polyester (OPET) coated with an amorphous polyethylene terephthalate copolymer (APET) heat seal layer; 0.5 mil available under the tradename Mylar® 50OL13 from DuPont Teijin Films.

The capping web was similarly laminated as disclosed in Example 5 to prepare a multilayer film consisting of the following layers (from outermost to innermost): PVDC/nylon/adhesive/OPET/APET.

Example 7

Another example of a film useful as a thermoformable forming web for preparing packages as described herein was an adhesive lamination of nylon and polyester.

Structural Components

Outer Structure Layer: nylon 6,6 coated with PVDC coating on one side; 4 mil thickness; available under the tradename Dartek® BF620 from DuPont of Canada/Liqui-Box.

Lamination Adhesive: Methyl ethyl ketone solvent-based polyester urethane adhesive available under the tradename Adcote 503A using catalyst 9L10 from the Morton division of Rohm and Haas. The 9L10 catalyst for the polyurethane adhesive system is recommended for high temperature cook-in applications.

Thermoformable/Seal Layer: biaxially oriented polyester (OPET) coated with an amorphous polyethylene terephthalate copolymer (APET) heat seal layer; 2.2 mil thickness; available under the tradename Mylar® 200XPOL12 from DuPont Teijin Films.

The structural components were laminated as disclosed in Example 1 except that the adhesive was applied to the PVDC-coated side of the nylon layer to prepare a multilayer film consisting of the following layers (from outermost to innermost): nylon/PVDC/adhesive/PET/sealant.

Example 8

Another example of a film was an adhesive lamination of nylon and polyester incorporating a polyester urethane adhesive designed to withstand elevated temperatures.

Structural Components

Outer Structure Layer: nylon 6,6 with PVDC coating on one side; 1.25 mil thickness; available under the tradename Dartek® B602 from DuPont of Canada/Liqui-Box.

Lamination Adhesive: Adcote 503A/Catalyst 9L10.

Polyester Layer: biaxially oriented polyester (OPET) coated with an amorphous polyethylene terephthalate copolymer (APET) heat seal layer; 0.5 mil available under the tradename Mylar® 50OL13 from DuPont Teijin Films.

The capping web was laminated as disclosed in Example 7 for the forming layer to prepare a multilayer film consisting of the following layers (from outermost to innermost): nylon/PVDC/adhesive/PET/sealant.

Packages prepared from the forming web of Example 7 and the capping web of Example 8 could be used to package raw meat products such as whole-bird chicken or turkey for cook-in applications.

The invention claimed is:

1. A laminate comprising or produced from (a) a thermoformable film layer; (b) a second thermoformable structural film layer; (c) a heat sealable layer; and optionally (d) a barrier layer wherein
 the thermoformable film layer is disposed between the second thermoformable structural film layer and the heat sealable layer and comprises or is produced from a polymer composition, which comprises or is derived from at least 80% by weight polyethylene terephthalate polymer and wherein the thermoformable film layer has a first surface and a second surface and has less than 5% shrink factor upon exposure to boiling water for five seconds;
 the second thermoformable structural film layer has less than 5% shrink factor upon exposure to boiling water for five seconds and is disposed adjacent and substantially coextensive with the first surface; and
 the heat sealable layer is adjacent and substantially coextensive with the second surface and comprises or is made from a copolyester, ionomer, or an ethylene vinyl acetate copolymer, or coextruded combinations of two or more thereof.

2. The laminate of claim 1 wherein the second thermoformable structural film layer comprises, or is made from, polyamide, polypropylene, polyethylene, ionomer, acid copolymer, ethylene vinyl acetate, polyethylene terephthalate, polystyrene, ethylene vinyl alcohol, polyvinylidene chloride, or coextruded combinations of two or more thereof.

3. The laminate of claim 2 wherein the second thermoformable structural film layer comprises, or is made from, the polyamide.

4. The laminate of claim 1 wherein the heat sealable layer comprises or is made from an amorphous copolyester.

5. The laminate of claim 3 wherein the heat sealable layer comprises or is made from amorphous polyethylene terephthalate.

6. The laminate of claim 1 wherein the barrier layer is prepared from oriented polyethylene terephthalate, polyvinylidene chloride, ethylene vinyl alcohol, nylon or biaxially oriented nylon, or blends or composites of two or more thereof.

7. The laminate of claim 6 wherein the barrier layer comprises or is made from polyvinylidene chloride.

8. The laminate of claim 6 comprising the barrier layer.

9. The laminate of claim 6 wherein each of the thermoformable film layer and the heat sealable layer comprises or is produced from a single layer of polymer composition comprising or produced from at least 80% by weight polyethylene terephthalate and the laminate optionally comprises the barrier layer.

10. A package comprising or produced from a film laminate as recited in claim 1.

11. The package of claim 10 having a combination of good barrier properties and heat-sealability.

12. The package of claim 10 produced from heat seals formed of a temperature-dependent sealant that ruptures and vents the package at the softening point of the sealant.

13. The package of claim 10 wherein the film laminate is thermoformed.

14. The package of claim 10 being in the form of a non-shrink bag.

15. The package of claim 14 further comprising a contained foodstuff.

16. The package of claim 15 wherein the foodstuff is meat, poultry, or seafood.

17. The package of claim 15 wherein the foodstuff is fresh, frozen, partially cooked, or value-added foodstuff.

18. The laminate of claim 4 wherein the laminate comprises the barrier layer and the barrier layer is or is prepared from oriented polyethylene terephthalate, polyvinylidene chloride, ethylene vinyl alcohol, nylon or biaxially oriented nylon, or blends or composites of two or more thereof.

19. The laminate of claim 5 wherein the laminate comprises the barrier layer and the barrier layer comprises or is made from polyvinylidene chloride.

20. A method of forming an article comprising thermoforming the laminate of claim 1.

21. An article prepared by the method of claim 20.

22. The article of claim 21 wherein the article has a shape comprising a pocket.

* * * * *